(12) United States Patent
Lim et al.

(10) Patent No.: US 12,500,974 B2
(45) Date of Patent: Dec. 16, 2025

(54) METHOD OF CONTROLLING CONTENT PLAYING DEVICE AND ELECTRONIC DEVICE PERFORMING THE METHOD

(71) Applicant: Samsung Electronics Co., Ltd., Suwon-si (KR)

(72) Inventors: Changbeom Lim, Suwon-si (KR); Jaeyung Yeo, Suwon-si (KR); Joohwan Kim, Suwon-si (KR); Hoseon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 18/172,718

(22) Filed: Feb. 22, 2023

(65) Prior Publication Data

US 2023/0199103 A1    Jun. 22, 2023

Related U.S. Application Data

(63) Continuation of application No. PCT/KR2022/016068, filed on Oct. 20, 2022.

(30) Foreign Application Priority Data

Nov. 18, 2021  (KR) ................ 10-2021-0159477

(51) Int. Cl.
  *H04M 1/02*  (2006.01)
  *H04M 1/72409*  (2021.01)
  *H04R 1/10*  (2006.01)

(52) U.S. Cl.
  CPC .... *H04M 1/724092* (2022.02); *H04R 1/1041* (2013.01)

(58) Field of Classification Search
  CPC ......... H04M 1/724092; H04M 1/6066; H04M 1/724097; H04M 1/72412;
  (Continued)

(56) References Cited

U.S. PATENT DOCUMENTS

| | | |
|---|---|---|
| 10,404,903 B2 | 9/2019 | Ito et al. |
| 2008/0057868 A1 | 3/2008 | Chang |

(Continued)

FOREIGN PATENT DOCUMENTS

| | | |
|---|---|---|
| CN | 106791243 A | 5/2017 |
| CN | 112218385 A | 1/2021 |

(Continued)

OTHER PUBLICATIONS

European Search Report dated Oct. 11, 2024, issued in European Application No. 22895871.6.

(Continued)

*Primary Examiner* — Tanmay K Shah
(74) *Attorney, Agent, or Firm* — Jefferson IP Law, LLP

(57) ABSTRACT

A method of controlling a content playing device and an electronic device performing the method are provided. The method of controlling a content playing device includes playing content on a second electronic device connected to an electronic device, identifying, by the electronic device, a third electronic device and connecting the electronic device to the third electronic device, determining whether a specialized function related to playing the content is present among functions of the second electronic device, and playing the content, played on the second electronic device, on the third electronic device.

20 Claims, 7 Drawing Sheets

(58) Field of Classification Search
CPC ............. H04M 1/72442; H04R 1/1041; H04R 2420/03; H04R 2420/07; H04R 2460/01; H04R 2499/13; H04R 1/1016; H04R 1/1083; H04R 5/04; H04W 8/005; H04N 21/43; H04N 21/436; H04N 21/43615; H04N 21/44227; H04N 21/485; H04N 21/43076; H04N 21/43079
USPC ....................................................... 455/557
See application file for complete search history.

(56) References Cited

U.S. PATENT DOCUMENTS

| | | |
|---|---|---|
| 2018/0098058 A1 | 4/2018 | Cichonski |
| 2020/0336829 A1 | 10/2020 | Bal et al. |

FOREIGN PATENT DOCUMENTS

| | | | |
|---|---|---|---|
| CN | 113271564 A | | 8/2021 |
| JP | 2007259246 A | * | 10/2007 |
| JP | 2008-011021 A | | 1/2008 |
| KR | 10-2009-0064237 A | | 6/2009 |
| KR | 2009064237 A | * | 6/2009 |
| KR | 10-2013-0110789 A | | 10/2013 |
| KR | 10-2015-0068002 A | | 6/2015 |
| KR | 10-1533368 B1 | | 7/2015 |

OTHER PUBLICATIONS

International Search Report dated Jan. 31, 2023, issued in International Application No. PCT/KR2022/016068.

* cited by examiner

METHOD OF CONTROLLING CONTENT PLAYING DEVICE AND ELECTRONIC DEVICE PERFORMING THE METHOD

CROSS-REFERENCE TO RELATED APPLICATION(S)

This application is a continuation application, claiming priority under § 365(c), of an International Application No. PCT/KR2022/016068, filed on Oct. 20, 2022, which is based on and claims the benefit of a Korean patent application number 10-2021-0159477, filed on Nov. 18, 2021, in the Korean Intellectual Property Office, the disclosure of which is incorporated by reference herein in its entirety.

BACKGROUND

1. Field

The disclosure relates to a method of controlling a content playing device and an electronic device performing the method.

2. Description of Related Art

When playing multimedia content on an electronic device, in case another electronic device is wirelessly connected while playing the multimedia content, the other electronic device connected while playing may seamlessly play the content.

When a third device is connected to an electronic device while a second electronic device connected to the electronic device plays the multimedia content, the third electronic device may seamlessly play the content. When the third electronic device is disconnected from the electronic device while the third electronic device plays the content, the second electronic device may seamlessly play the content.

The above information is presented as background information only to assist with an understanding of the disclosure. No determination has been made, and no assertion is made, as to whether any of the above might be applicable as prior art with regard to the disclosure.

SUMMARY

When a third electronic device is connected to an electronic device and content is played on the third electronic device while a second electronic device connected to the electronic device plays the content, a function that is set related to content playback in the second electronic device may not change and may be maintained in an active state. A user may experience inconvenience as the function activated in the second electronic device affects the user's sight, touch, and/or hearing.

Aspects of the disclosure are to address at least the above-mentioned problems and/or disadvantages and to provide at least the advantages described below. Accordingly, an aspect of the disclosure is to provide a method of controlling a content playing device that may control a specialized function of a second electronic device related to content playing and an electronic device performing the method.

Another aspect of the disclosure is to provide a method of controlling a content playing device that may store a setting state of a specialized function of a second electronic device related to content playing and may set the specialized function of the second electronic device by using the stored setting state and an electronic device performing the method.

Additional aspects will be set forth in part in the description which follows and, in part, will be apparent from the description, or may be learned by practice of the presented embodiments.

In accordance with an aspect of the disclosure, a method of controlling a content playing device is provided. The method includes playing content on a second electronic device connected to an electronic device, identifying, by the electronic device, a third electronic device and connecting the electronic device to the third electronic device, determining whether a specialized function related to playing the content is present among functions of the second electronic device, and playing the content, played on the second electronic device, on the third electronic device.

In accordance with another aspect of the disclosure, a method of controlling a content playing device is provided. The method includes playing content on a second electronic device that is connected to an electronic device and communicates with the electronic device, identifying, by the electronic device, a third electronic device and connecting the third electronic device to the electronic device to communicate with each other, among functions, related to playing the content, of the second electronic device, determining a specialized function affecting a user's sense when the second electronic device does not play the content, playing the content, played on the second electronic device, on the third electronic device, and controlling the second electronic device to deactivate the specialized function when the content is played on the third electronic device.

In accordance with another aspect of the disclosure, an electronic device is provided. The electronic device includes at least one processor, and a memory configured to store instructions, which are executed by the at least one processor, and a setting state of a specialized function of a second electronic device, wherein the memory may be configured to, when executed by the at least one processor, play content on the second electronic device connected to the electronic device, control the electronic device to identify a third electronic device, connect the electronic device to the third electronic device, determine whether the specialized function related to playing the content is present among functions of the second electronic device, and play the content, played on the second electronic device, on the third electronic device.

According to various example embodiments, when content played on a second electronic device is continuously played on another electronic device, the user's sense may not be affected by a specialized function of the second electronic device by controlling the specialized function, related to content playback, of the second electronic device even if the second electronic device does not play the content.

According to various example embodiments, when a setting state of the specialized function related to the second electronic device is stored and the second electronic device plays the content again, the specialized function of the second electronic device may be set based on the setting state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
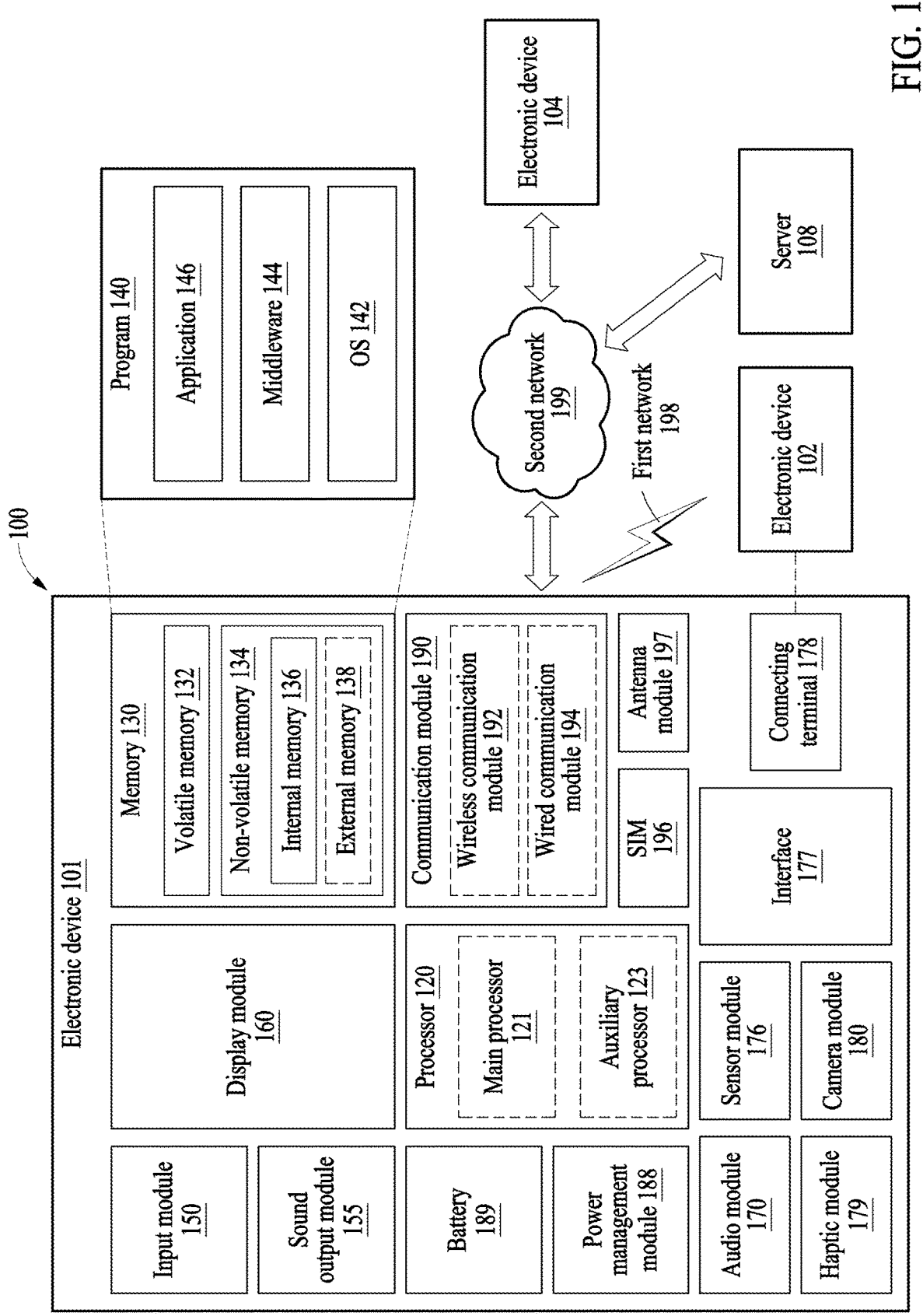
FIG. 1 is a block diagram illustrating an electronic device in a network environment according to an embodiment of the disclosure.

FIG. 1 is a block diagram illustrating an electronic device in a network environment according to an embodiment of the disclosure. Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control a circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert sound into an electrical signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electrical signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
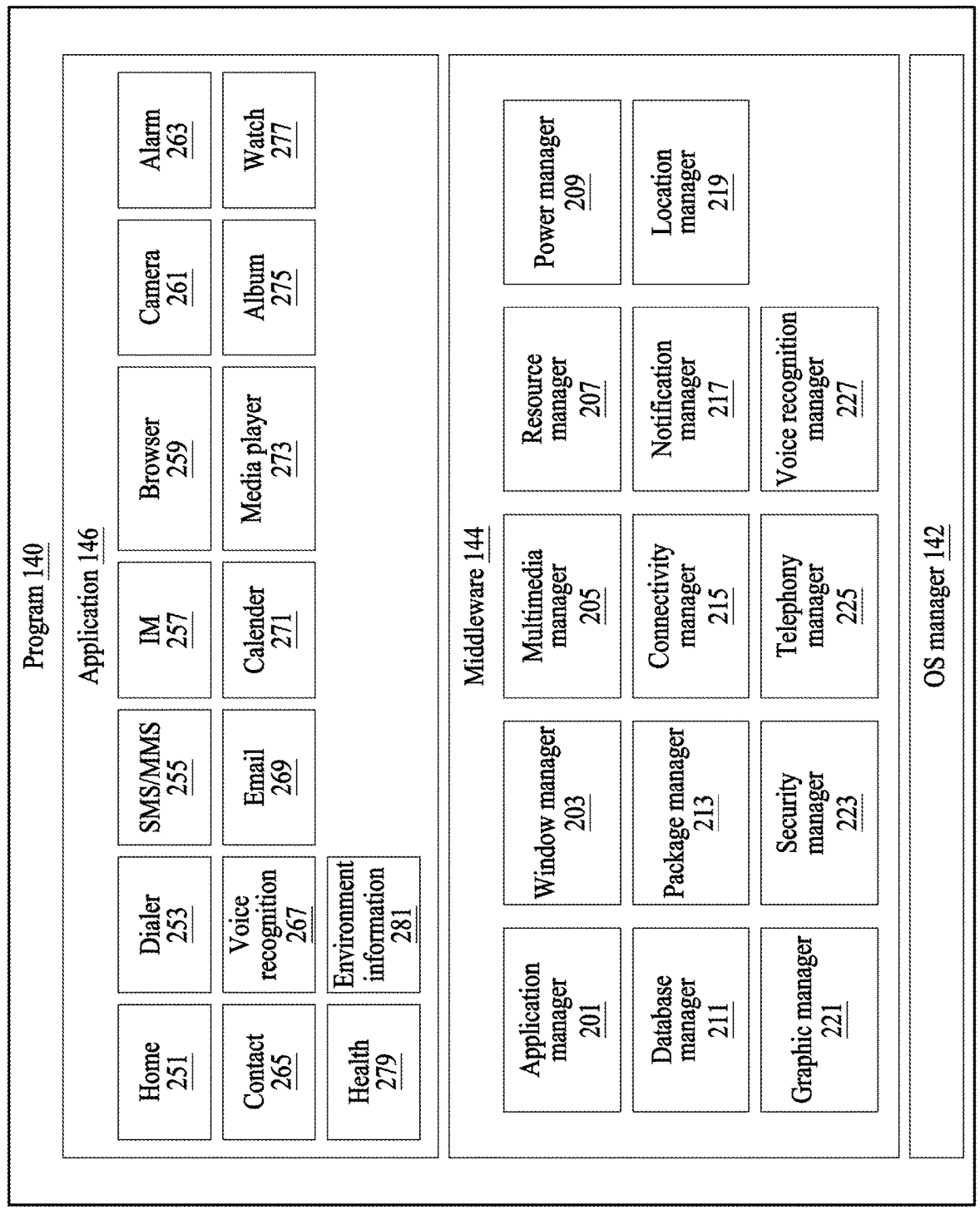
FIG. 2 is a block diagram illustrating a program according to an embodiment of the disclosure.

FIG. 2 is a block diagram illustrating a program according to an embodiment of the disclosure.

FIG. 2 is a block diagram illustrating a program according to various example embodiments. According to an example embodiment, as illustrated in block diagram 200, a program 140 may include an OS 142 to control one or more resources of the electronic device 101, middleware 144, or an application 146 executable by the OS 142. The OS 142 may include, for example, Android™, iOS™, Windows™ Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include at least one other drive program to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189 and may determine or provide related information to be used for the operation of the electronic device 101, based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108 and may receive, from the server 108, a command corresponding to a function to be executed by the electronic device 101, based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

Figure 3:
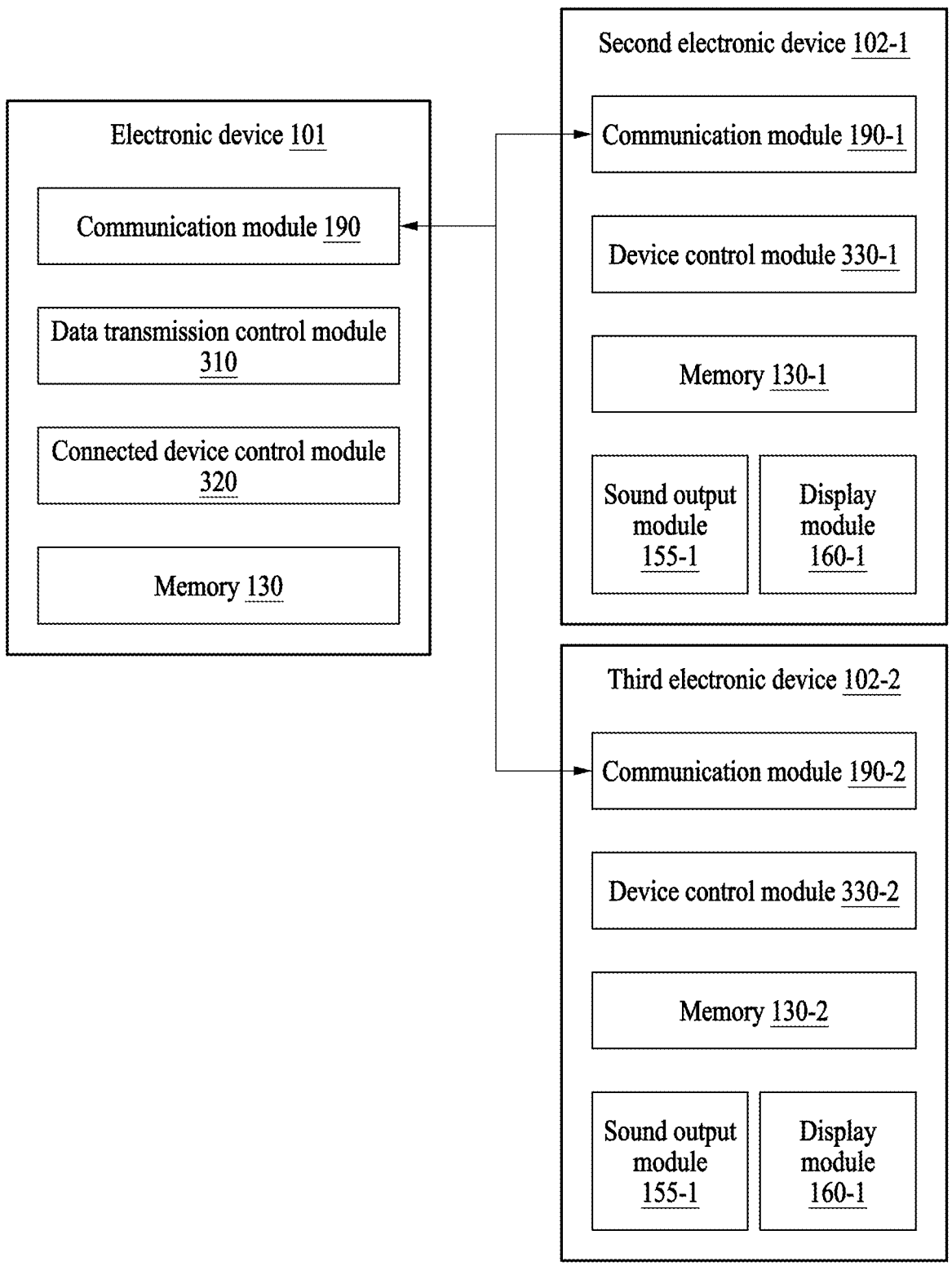
FIG. 3 is a diagram illustrating operations of an electronic device, a second electronic device, and a third electronic device according to an embodiment of the disclosure.

FIG. 3 is a diagram illustrating an operation of an electronic device, a second electronic device, and a third electronic device according to an embodiment of the disclosure.

Referring to FIG. 3, an electronic device 101 may include a communication module 190, a data transmission control module 310, a connected device control module 320, and/or a memory 130. An operation of at least one component (e.g., the communication module 190, the data transmission control module 310, the connected device control module 320, and/or the memory 130) shown in FIG. 3 may be performed by the processor 120 of the electronic device 101 of FIG. 1.

The communication module 190 of the electronic device 101 may control connection and disconnection of communication with the second electronic device 102-1 and/or with the third electronic device 102-2. The communication module may include a communication circuitry. For example, the communication module 190 of the electronic device 101 may control connection of at least one external electronic device (e.g., the second electronic device 102-1 and the third electronic device 102-2). For example, the electronic device 101 may identify the external electronic device connectable to the communication module 190 by wire and/or wireless communication. For example, the electronic device 101 may store a profile of the external electronic device connected via the communication module 190. When the external electronic device once connected to the electronic device 101 is detected, the electronic device 101 may connect and communicate with the external electronic device by using the stored profile.

The data transmission control module 310 of the electronic device 101 may determine an external electronic device between the second electronic device 102-1 and the third electronic device 102-2 connected to the electronic device 101, to transmit content. For example, transmitting the content to the external electronic device may be transmitting data required to play the content.

The data transmission control module 310 may determine a connection state of a plurality of external electronic devices connected to the electronic device 101 and on which content may be played. The data transmission control module 310 may control an external electronic device with high priority in playing the content among the plurality of external electronic devices to play the content.

For example, when the third electronic device 102-2 with a higher priority in playing the content than the second electronic device 102-1 is connected to electronic device 101, while playing content on the second electronic device 102-1 connected to the electronic device 101, the data transmission control module 310 may stop playing the content in the second electronic device 102-1 and may control the third electronic device 102-2 to play the content.

More specifically, when an external electronic device (e.g., a vehicle) with a higher priority than a wearable device is connected to the electronic device 101 while playing content on the wearable device connected to the electronic device 101, the data transmission control module 310 may stop playing the content in the wearable device and may control the external electronic device (e.g., the vehicle) to play the content. The data transmission control module 310 may allow the content played on Bluetooth earphones to be continuously played on the vehicle. For example, a wearable device connected to the electronic device 101 may include wearable wireless earphones, a headset, earbuds, and/or augmented reality (AR) glasses. However, the example is not limited thereto. The electronic device 101 may connect to the wearable device through a short-range wireless communication. For example, the electronic device 101 may perform wireless communication in a short-range by a Bluetooth network specified by a Bluetooth™ special interest group (SIG). The Bluetooth network may include, for example, a Bluetooth legacy network or a Bluetooth low energy (BLE) network.

In one embodiment, the electronic device 101 may store a priority of the plurality of external electronic devices for content playback. For example, the electronic device 101 may store a preset priority of the plurality of external electronic devices or a priority determined by a user input. In one embodiment, the priority may be stored in the memory 130.

The connected device control module 320 of the electronic device 101 may store, in the memory 130, a setting state of the plurality of external electronic devices connected to the electronic device 101 and may control a function of the plurality of external electronic devices by identifying the setting state stored in the memory 130.

In one embodiment, the connected device control module 320 may control functions of the second electronic device 102-1 and/or the third electronic device 102-2. For example, the connected device control module 320 may control a function, such as content playback, pause, stop, volume adjustment, image control, and/or sound control of the second electronic device 102-1 and/or the third electronic device 102-2.

In one embodiment, the function of the second electronic device 102-1 and/or the third electronic device 102-2 controlled by the connected device control module 320 may include a specialized function related to content playback. In one embodiment, the specialized function may be a function affecting a sense (e.g., hearing, sight, and/or touch) of the user while the content is not played.

In one embodiment, the connected device control module 320 of the electronic device 101 may control the specialized function of the second electronic device 102-1. In one embodiment, the connected device control module 320 may identify whether the second electronic device 102-1 plays content and when the second electronic device 102-1 does not play content, the connected device control module 320 may control a specialized function of the second electronic device 102-1. The specialized function may be a function related to content playback.

For example, while the second electronic device 102-1 plays content, the third electronic device 102-2 may be connected to the electronic device 101 and the content may be played on the third electronic device 102-2. When the second electronic device 102-1 does not play content, for example, when the content played on the second electronic device 102-1 is continuously played on the third electronic device 102-2, the connected device control module 320 may control the specialized function of the second electronic device 102-1.

More specifically, content played on a wearable device (e.g., Bluetooth earphones) connected to the electronic device 101 may stop and the content played on the wearable device may be continuously played on an external electronic device (e.g., a vehicle). The connected device control module 320 may identify whether the wearable device plays the content and may control a noise-canceling function, which is the specialized function related to content playback. For example, when the wearable device plays content (e.g., music), the noise-canceling function may be in an active state. When the wearable device stops playing the content, the connected device control module 320 may deactivate the noise-cancelling function. The noise-cancelling function may be a function to remove external ambient noise. For example, the second electronic device 102-1 may obtain ambient sound by using a microphone (not shown) and may include at least one component (e.g., an active noise canceling (ANC) module, not shown) for providing the noise-cancelling function to remove noise by using the obtained ambient sound.

The memory 130 may store instructions executed by a processor (e.g., the processor 120 of FIG. 1) and a setting state of the specialized function of the second electronic device 102-1.

For example, when the second electronic device 102-1 stops playing content and the third electronic device 102-2 continuously plays the content, the electronic device 101 may identify the setting state of the specialized function of the second electronic device 102-1 and store the setting state. For example, the connected device control module 320 may identify whether the second electronic device 102-1 plays content and whether the specialized function is active or inactive. The electronic device 101 may store, in the memory 130, the setting state of the specialized function, for example, whether the specialized function is active or inactive. For example, when the second electronic device 102-1 stops playing the content, the electronic device 101 may store, in the memory 130, whether the noise-cancelling function of the second electronic device 102-1 is active or inactive. In one embodiment, the electronic device 101 may play content on the third electronic device 102-2 and then, may play the content on the second electronic device 102-1. For example, based on disconnection of the third electronic device 102-2 or a user input, the electronic device 101 may stop playing content on the third electronic device 102-2 and may continuously play the content on the second electronic device 102-1.

In one embodiment, when the third electronic device 102-2 stops playing content and the second electronic device 102-1 continuously plays the content, the electronic device 101 may identify the setting state of the specialized function stored in the memory 130. For example, the setting state of the specialized function stored in the memory 130 may be an active state or an inactive state of the specialized function set in the second electronic device 102-1, when the second electronic device 102-1 stops playing the content and the third electronic device 102-2 continuously plays the content.

In one embodiment, the electronic device 101 may set the specialized function of the second electronic device 102-1 based on the identified setting state. For example, when the setting state of the specialized function of the second electronic device 102-1 is stored as the active state in the memory 130 and the second electronic device 102-1 plays the content after the third electronic device 102-2 plays the content, the electronic device 101 may set the specialized function of the second electronic device 102-1 based on the setting state of the specialized function stored in the memory 130. For example, when the specialized function stored in the memory 130 is the active state, the electronic device 101 may set the specialized function of the second electronic device 102-1 to the active state.

The memory 130 may store the priority of the external electronic devices. For example, for the second electronic device 102-1 and the third electronic device 102-2, the electronic device 101 may store the priority that the third electronic device 102-2 has a higher priority to play content in memory 130.

The memory 130 may store functions of the second electronic device 102-1 and/or the third electronic device 102-2. In one embodiment, the memory 130 may store functions controllable by a device control module 330-1 of the second electronic device 102-1. For example, the function of the second electronic device 102-1, stored in the memory 130, may include the specialized function of the second electronic device 102-1 and the electronic device 101 may identify the specialized function of the second electronic device 102-1 among functions, which are stored in the memory 130, of the second electronic device 102-1. The electronic device 101 may identify the specialized function of the second electronic device 102-1, may identify the setting state of the identified specialized function, and may control the setting state of the specialized function when the second electronic device 102-1 stops playing the content.

Referring to FIG. 3, the second electronic device 102-1 and the third electronic device 102-2 may include communication modules 190-1 and 190-2, device control modules 330-1 and 330-2, memories 130-1 and 130-2, sound output modules 155-1 and 155-2, and/or display modules 160-1 and 160-2, respectively.

In one embodiment, some of the components of the second electronic device 102-1 and the third electronic device 102-2 shown in FIG. 3 may be omitted or added. For example, although not shown, at least one of the second electronic device 102-1 and the third electronic device 102-2 may further include a haptic module (e.g., the haptic module 179).

The device control modules 330-1 of the second electronic device 102-1 may control a function of the second electronic device. The device control modules 330-2 of the third electronic device 102-2 may control a function of the third electronic device 102-2. The function controlled by the device control modules 330-1 and 330-2 may include the specialized function related to content playback.

In one embodiment, the device control modules 330-1 and 330-2 may respectively control functions of the second electronic device 102-1 and the third electronic device 102-2 based on function control of the second electronic device 102-1 and the third electronic device 102-2 determined by the connected device control module 320 of the electronic device 101.

The sound output modules 155-1 and 155-2 and/or the display modules 160-1 and 160-2 of the second electronic device 102-1 and the third electronic device 102-2 may output sound and/or an image of content.

The communication modules 190-1 and 190-2, the memories 130-1 and 130-2, the sound output modules 155-1 and 155-2, and/or the display modules 160-1 and 160-2 of the second electronic device 102-1 and the third electronic device 102-2 shown in FIG. 3 may be substantially similar or the same as the communication module 190, the memory 130, the sound output module 155, and/or the display module 160 of the electronic device 101 of FIG. 1. For example, although a description of the communication modules 190-1 and 190-2, the memories 130-1 and 130-2, the sound output modules 155-1 and 155-2, and/or the display modules 160-1 and 160-2 of the second electronic device 102-1 and the third electronic device 102-2 is omitted, the description of the communication module 190, the memory 130, the sound output module 155, and/or the display module 160 of the electronic device 101 may be applicable substantially in the same manner thereto.

Figure 4:
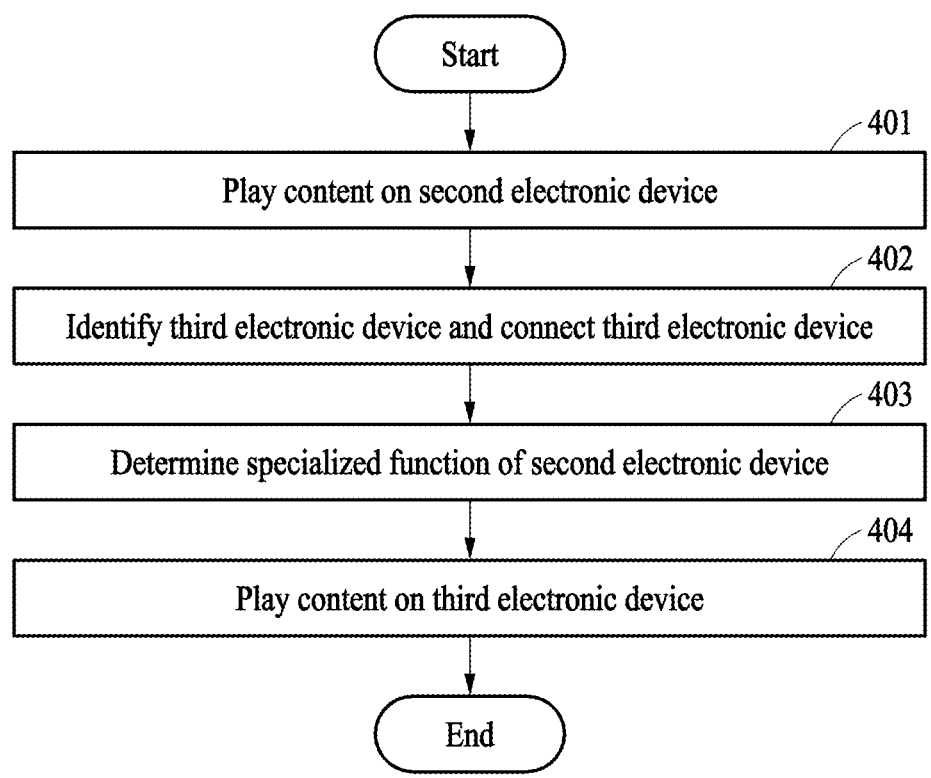
FIG. 4 is a diagram illustrating an operation of the electronic device continuously playing content, which is played on the second electronic device, on the third electronic device, according to an embodiment of the disclosure.

FIG. 4 is a diagram illustrating an operation of an electronic device continuously playing content, which is played on the second electronic device, on a third electronic device, according to an embodiment of the disclosure.

FIG. 4 is a diagram illustrating an operation of an electronic device (e.g., an electronic device of FIG. 1 or 3) to continuously play content, played on a second electronic device (e.g., a second electronic device of FIG. 3), on a third electronic device (e.g., a third electronic device of FIG. 3).

In operation 401, the electronic device 101 may play content on the second electronic device 102-1. For example, the second electronic device 102-1 may be connected to the electronic device 101 by wire or wirelessly and the second electronic device 102-1 may receive, from the electronic device 101, data required to play the content.

In operation 402, the electronic device 101 may identify the third electronic device 102-2 through a communication module (e.g., the communication module 190 of FIG. 1) and may connect to the third electronic device 102-2.

In operation 403, the electronic device 101 may determine a specialized function of the second electronic device 102-1. In one embodiment, in operation 403, the electronic device 101 may identify whether the specialized function related to content playback is available in the second electronic device 102-1 and may identify the setting state of the specialized function of the second electronic device 102-1.

In operation 404, the electronic device 101 may play the content on the third electronic device 102-2. In one embodiment, the electronic device 101 may play the content on the third electronic device 102-2 by considering the priority set in the second electronic device 102-1 and the third electronic device 102-2. The electronic device may continuously play the content, which is played on the second electronic device 102-1, on the third electronic device 102-2.

In operation 404, the electronic device 101 may stop playing the content on the second electronic device 102-1. For example, the electronic device 101 may transmit a signal to stop playing the content to the second electronic device 102-1 or may stop transmitting data required to play the content to the second electronic device 102-1.

Figure 5:
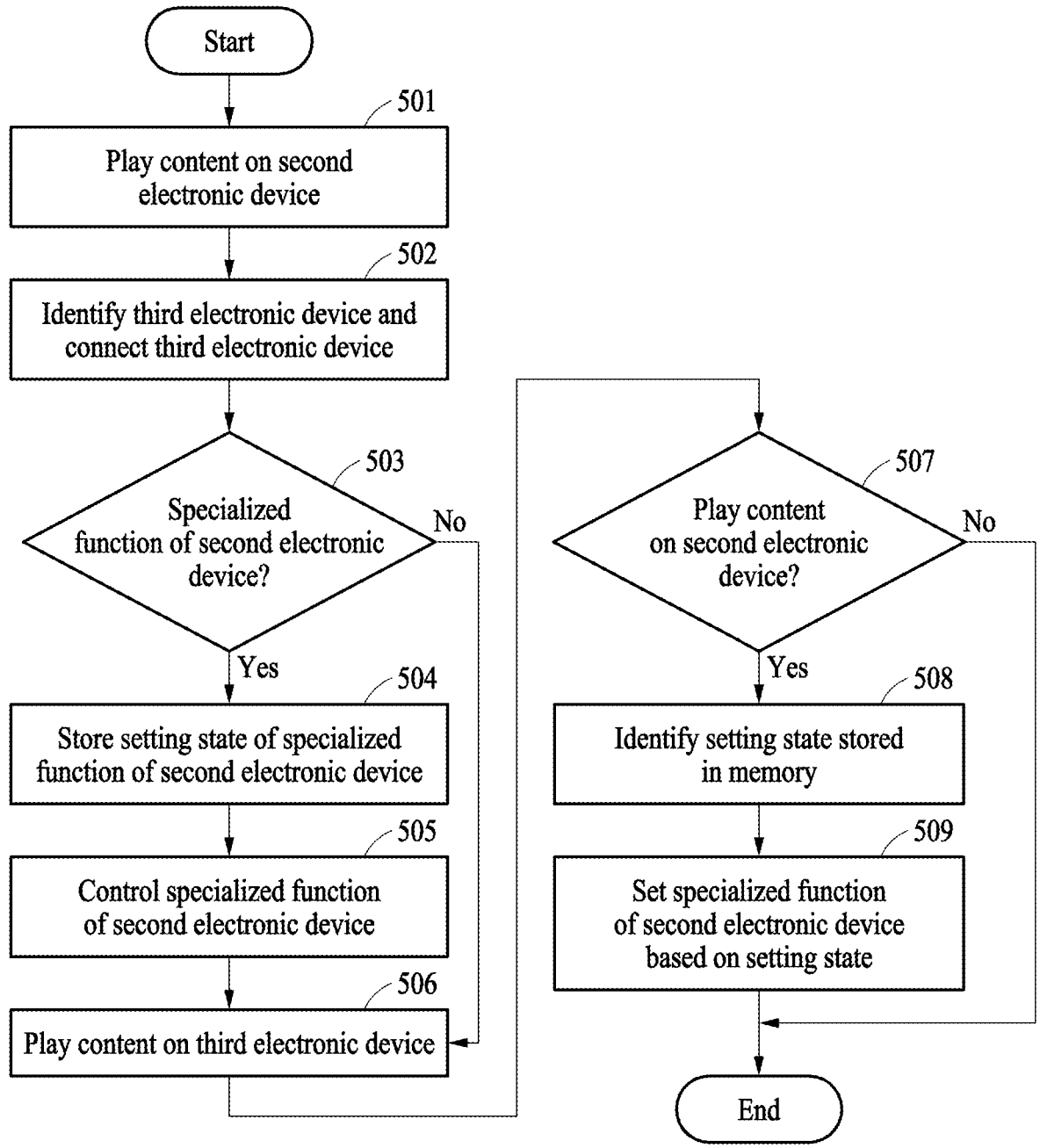
FIG. 5 is a diagram illustrating an operation of the electronic device to control a specialized function of the second electronic device according to an embodiment of the disclosure.

FIG. 5 is a diagram illustrating an operation of the electronic device to control a specialized function of the second electronic device according to an embodiment of the disclosure.

FIG. 5 illustrates an operation of an electronic device (e.g., an electronic device of FIG. 1 or 3) to control a specialized function of a second electronic device (e.g., a second electronic device of FIG. 3). The electronic device 101 may be connected to the second electronic device 102-1 via the communication module 190.

In operation 501, the electronic device 101 may play content on the second electronic device 102-1. In operation 502, the electronic device 101 may identify a third electronic device (e.g., the third electronic device 102-2 of FIG. 3) via the communication module 190 and may connect to the third electronic device 102-2.

In operation 503, the electronic device 101 may determine whether the second electronic device 102-1 has a specialized function.

In one embodiment, the specialized function may be a function affecting a sense of a user. For example, when the specialized function is active while the second electronic device 102-1 does not play content, the activated specialized function may affect the sense of user.

In one embodiment, the second electronic device 102-1 may be a device that is worn on the user's ear, such as wireless earphones, for playing content. When the noise-cancelling function of the second electronic device 102-1 is active, the noise-cancelling function of the second electronic device 102-1 may affect the user to recognize the external sound.

In one embodiment, the second electronic device 102-1 may be a wearable electronic device worn by the user, such as AR glasses. For example, when the glasses are controlled to be opaque by activating a glasses transparency control function of the second electronic device 102-1, the glasses transparency control function of the second electronic device 102-1 may affect the user to visually recognize outside. The transparency control function may be a function to control the transparency of a glass of the AR glasses.

The above example may be one of various examples and when the second electronic device 102-1 provides content using vibration and/or touch to a user, a function to provide vibration and/or touch to the user may be the specialized function.

In one embodiment, to identify the specialized function of the second electronic device 102-1, the electronic device 101 may store, in a memory (e.g., the memory 130 of FIG. 1 or 3), the specialized function related to content playback and may identify the specialized function of the second electronic device 102-1 by using the stored specialized function related to content playback. For example, the specialized function stored in the memory may be a function that is set to be controlled when content is played on the third electronic device 102-2.

For example, the electronic device 101 may store various functions, such as volume adjustment, audio effect setting (e.g., equalizer (EQ)), section repeat, speed adjustment, and/or noise-cancelling, as functions related to content played by audio and may store the noise-cancelling function among the functions related to content playback as the specialized function. When the second electronic device 102-1 connected to the electronic device 101 provides the noise-cancelling function, the electronic device 101 may determine the noise-cancelling function of the second electronic device 102-1 as the specialized function by comparing with the specialized function stored in the memory.

When the electronic device 101 identifies the specialized function of the second electronic device 102-1 in operation 503, the electronic device 101 may store the setting state of the specialized function of the second electronic device 102-1 in operation 504. For example, the electronic device 101 may store an active state or an inactive state of the specialized function of the second electronic device 102-1 as the setting state.

The electronic device 101 may store a level of the specialized function of the second electronic device 102-1 as the setting state. For example, when the second electronic device 102-1 is AR glasses and the specialized function of the second electronic device 102-1 is the transparency control function of a glass, the electronic device 101 may store whether the transparency control function is active and the level of transparency.

In operation 504, the electronic device 101 may store, in the memory, functions related to content playback other than the specialized function of the second electronic device 102-1. For example, when the content is music and the second electronic device 102-1 is Bluetooth earphones, the electronic device 101 may store a function related to content playback, such as a volume level, in the memory.

In operation 505, the electronic device 101 may control the specialized function of the second electronic device 102-1. When the second electronic device 102-1 stops playing content and the third electronic device 102-2 continuously plays the content played on the second electronic device 102-1, the electronic device 101 may store whether to activate or deactivate the specialized function of the second electronic device 102-1 in the memory.

The electronic device 101 may control the specialized function of the second electronic device 102-1, based on control information, stored in the memory, on whether to activate or deactivate the specialized function of the second electronic device 102-1.

In operation 504, the setting state, stored by the electronic device 101, of the specialized function of the second electronic device 102-1 may be an active state or an inactive state of the specialized function when the second electronic device 102-1 plays the content. In operation 505, the control information stored in the memory by the electronic device 101 may be data for controlling the specialized function of the second electronic device 102-1 when the content played on the second electronic device 102-1 is continued to be played on the third electronic device 102-2. The electronic device 101 may activate an inactive specialized function of the second electronic device 102-1 or deactivate an active specialized function of the second electronic device 102-1, based on the control information.

For example, the electronic device 101 may play content on the second electronic device 102-1, which is wireless earphones, may identify the third electronic device 102-2, which is a vehicle, and may control the third electronic device 102-2 to continuously play the content played by the second electronic device 102-1. As shown in operation 504, the electronic device 101 may store, in the memory, an active or inactive state of the noise-cancelling, which is the specialized function of the wireless earphone. When the noise-cancelling of the wireless earphone is in the active state, the electronic device 101 may deactivate the noise-cancelling of the wireless earphones, based on control information set to deactivate the noise-cancelling, which is the specialized function of the wireless earphones and stored in the memory as shown in operation 505.

In one embodiment, an OS and/or an application may control the specialized function of the second electronic device 102-1. When the third electronic device 102-2 continuously plays the content played by the second electronic device 102-1, the electronic device 101 may control the specialized function of the second electronic device 102-1 by identifying the active or inactive state, stored in the memory, of the specialized function of the second electronic device 102-1.

For example, the device management application described with reference to FIG. 2 may control some components or functions of the second electronic device 102-1 and/or the third electronic device 102-2 communicating with the electronic device 101. In one embodiment, the device management application may control a function, of the second electronic device 102-1, related to a content. The device management application may control the specialized function of the second electronic device 102-1.

The electronic device 101 may deactivate the noise-cancelling function of the second electronic device 102-1 and may deactivate the transparency control function of the second electronic device 102-1.

In operation 506, the electronic device 101 may play the content on the third electronic device 102-2.

The electronic device 101 may determine a device with high priority to play the content by considering the priority for content playback set in the second electronic device 102-1 and the third electronic device 102-2.

In operation 507, the electronic device 101 may determine whether to play the content on the second electronic device 102-1. When the power of the third electronic device 102-2 is turned off or the third electronic device 102-2 disconnects from the electronic device 101, the electronic device 101 may determine whether the content is playable on the second electronic device 102-1.

When the electronic device 101 determines that the content is playable on the second electronic device 102-1 in operation 507, in operation 508, the electronic device 101 may identify the setting state of the specialized function, of the second electronic device 102-1, related to content playback and stored in the memory. In operation 509, the electronic device 101 may set the specialized function of the second electronic device 102-1 based on the setting state.

When the specialized function of the second electronic device 102-1 is in the active state in operation 504, the electronic device may store the setting state in the memory. In operation 505, the electronic device 101 may deactivate the specialized function of the second electronic device 102-1. In operation 508, the electronic device 101 may identify the setting state stored in the memory and in operation 509, the electronic device 101 may activate the specialized function of the second electronic device 102-1.

FIGS. 6A, 6B, 6C, 7A, 7B, and 7C are diagrams illustrating an operation of an electronic device to play content control a specialized function according to various embodiments of the disclosure.

Referring to FIGS. 6A to 6C, and 7A to 7C, an electronic device 101 may deactivate at least one of the noise-cancelling function and the transparency control function of a second electronic device 102-1.

Figure 6A:
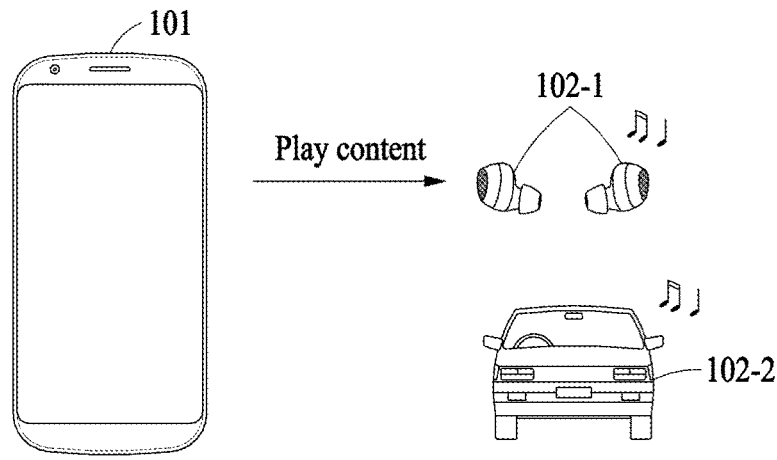
FIGS. 6A, 6B, 6C, 7A, 7B, and 7C are diagrams illustrating an operation of the electronic device to play content and control a specialized function according to various embodiments of the disclosure.
Figure 6B:
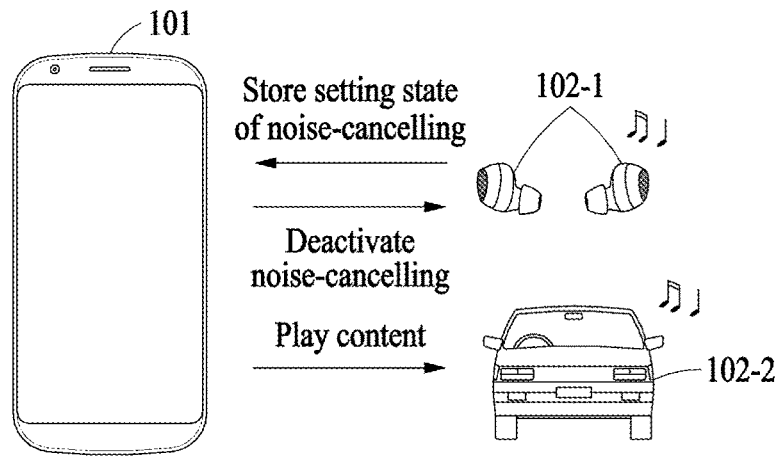
Figure 6C:
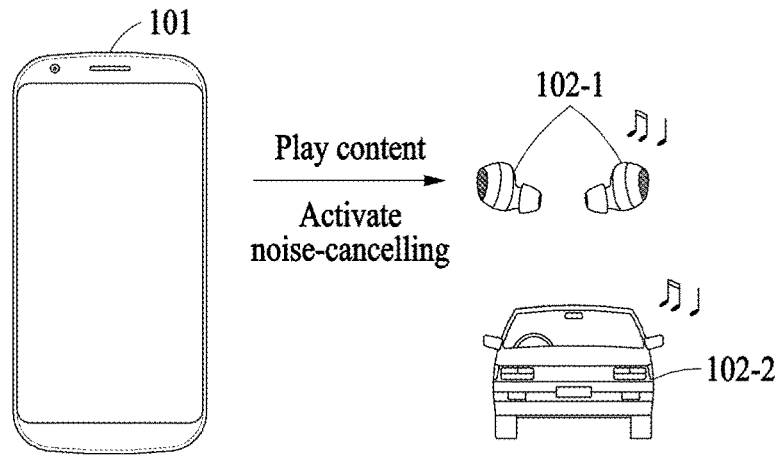

FIGS. 6A to 6C illustrate an operation of an electronic device to control the noise-cancelling function, which is the specialized function, of a second electronic device.

FIG. 6A illustrates that an electronic device plays content on a second electronic device connected to the electronic device.

FIG. 6B illustrates that from FIG. 6A, as the third electronic device, which is a vehicle, is connected, the content is continuously played on the third electronic device with a higher priority than the second electronic device.

In FIG. 6B, the electronic device 101 may stop playing the content on the second electronic device 102-1. The electronic device 101 may identify the specialized function among functions of the second electronic device 102-1. The electronic device 101 may store the setting state of the noise-cancelling function, which is the specialized function, of the second electronic device 102-1. The electronic device 101 may control the noise-cancelling function, which is the specialized function, of the second electronic device 102-1.

FIG. 6C illustrates that from FIG. 6B, as the third electronic device is disconnected from the electronic device, the electronic device plays the content on the second electronic device.

The electronic device 101 may identify the setting state, stored in a memory (e.g., the memory 130 of FIG. 1), of the specialized function of the second electronic device 102-1 and may set the specialized function of the second electronic device 102-1, based on the setting state. As shown in FIG. 6C, the electronic device 101 may activate the noise-cancelling function of the second electronic device 102-1.

Figure 7A:
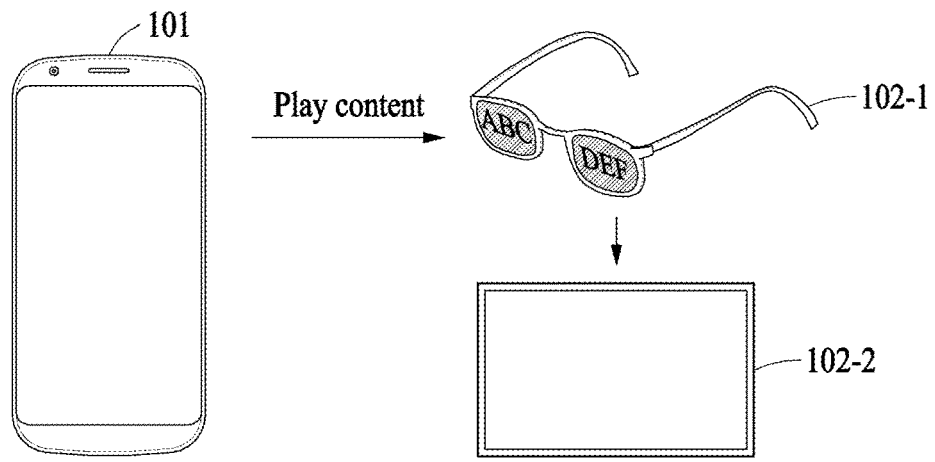
Figure 7B:
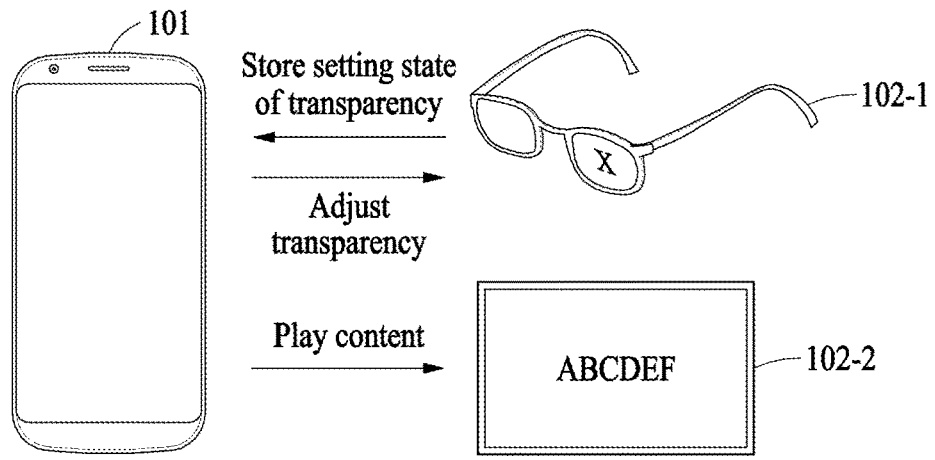
Figure 7C:
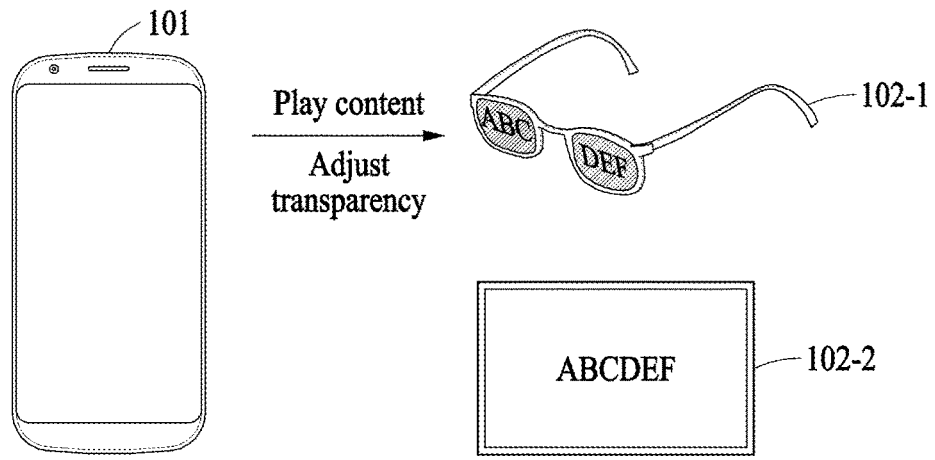

FIGS. 7A to 7C are diagrams illustrating an operation of the electronic device to control a transparency control function, which is a specialized function, of the second electronic device that is AR glasses.

FIG. 7A illustrates that the electronic device plays content on the second electronic device connected to the electronic device.

FIG. 7B illustrates that from FIG. 7A, as the third electronic device, which is a television (TV) is connected, the content is continuously played on the third electronic device with a higher priority than the second electronic device 102-1.

Referring to FIG. 7B, an electronic device 101 may stop playing the content on a second electronic device 102-1. The electronic device 101 may identify the specialized function among functions of the second electronic device 102-1. The electronic device 101 may store the setting state of the transparency control function, which is the specialized function, of the second electronic device 102-1. For example, the electronic device 101 may store whether the transparency control function is active and a level of transparency. The electronic device 101 may control (e.g., deactivate) the transparency control function, which is the specialized function of the second electronic device 102-1.

FIG. 7C illustrates that a third electronic device is disconnected from an electronic device from FIG. 7B and the electronic device plays the content on a second electronic device.

The electronic device 101 may identify the setting state, stored in a memory (e.g., the memory 130 of FIG. 1), of the specialized function of the second electronic device 102-1 and may set the specialized function of the second electronic device 102-1, based on the setting state. As shown in FIG. 7C, the electronic device 101 may activate (e.g., control to be opaque) the transparency control function of the second electronic device 102-1.

Referring to FIGS. 7A to 7C, the content played on a second electronic device 102-1 of FIG. 7A may be continuously played on a third electronic device 102-2 of FIG. 7B and the content played on a third electronic device 102-2 of FIG. 7B may be continuously played on a second electronic device 102-1 of FIG. 7C.

In one embodiment, the setting state stored in the memory may include a level of the specialized function. For example, the setting state may include whether the transparency control function, which is the specialized function, is active and a level of transparency.

According to various embodiments, a method of controlling a content playing device may include playing content on the second electronic device 102-1 connected to the electronic device 101, identifying, by the electronic device 101, the third electronic device 102-2 and connecting the electronic device 101 to the third electronic device 102-2, determining whether a specialized function related to playing the content is present among functions of the second electronic device 102-1, and playing the content, played on the second electronic device 102-1, on the third electronic device 102-2.

The playing of the content on the third electronic device 102-2 may include, by considering a priority set for the second electronic device 102-1 and the third electronic device 102-2, in case the priority of the third electronic device 102-2 is higher than the priority of the second electronic device 102-1, playing the content on the third electronic device 102-2.

The determining whether the specialized function is present may include storing, in the memory 130, the setting state of the specialized function for the third electronic device 102-2.

The method of controlling a content playing device may further include playing the content on the second electronic device 102-1 after playing the content on the third electronic device 102-2, identifying the setting state stored in the memory 130, and setting the specialized function of the second electronic device 102-1, based on the setting state.

The determining whether the specialized function is present may include controlling the specialized function of the second electronic device 102-1.

The controlling of the specialized function may include controlling at least one of a noise-cancelling function and a transparency control function of the second electronic device 102-1.

According to various embodiments, a method of controlling a content playing device may include playing content on the second electronic device 102-1 that is connected to the electronic device 101 and communicates with the electronic device 101, identifying, by the electronic device 101, the third electronic device 102-2 and connecting the third electronic device 102-2 to the electronic device 101 to communicate with each other, among functions, related to playing the content, of the second electronic device 102-1, determining a specialized function affecting a user's sense when the second electronic device 102-1 does not play the content, playing the content, played on the second electronic device 102-1, on the third electronic device 102-2, and controlling the second electronic device 102-1 to deactivate the specialized function when the content is played on the third electronic device 102-2.

The determining of the specialized function may include determining the specialized function by comparing a function of the second electronic device 102-1 with a function that is set to be controlled when the content is played on the third electronic device 102-2.

The controlling of the second electronic device 102-1 may include deactivating at least one of a noise-cancelling function and a transparency control function of the second electronic device 102-1.

The playing of the content on the third electronic device 102-2 may include, by considering a priority set for the second electronic device 102-1 and the third electronic device 102-2, in case the priority of the third electronic device 102-2 is higher than the priority of the second electronic device 102-1, playing the content on the third electronic device 102-2.

The determining of the specialized function may include storing a setting state of the specialized function in the memory 130, playing the content on the second electronic device 102-1 after playing the content on the third electronic device 102-2, identifying the setting state stored in the memory 130, and setting the specialized function of the second electronic device 102-1, based on the setting state.

According to various embodiments, the electronic device 101 may include at least one processor 120, and the memory 130 configured to store instructions, which are executed by the processor 120, and a setting state of a specialized function of the second electronic device 102-1, wherein the memory 130 may be configured to, when executed by the processor 120, play content on the second electronic device 102-1 connected to the electronic device, control the electronic device to identify the third electronic device 102-2, connect the electronic device to the third electronic device 102-2, determine whether the specialized function related to playing the content is present among functions of the second electronic device 102-1, and play the content, played on the second electronic device 102-1, on the third electronic device 102-2.

The memory 130 may be further configured to, when executed by the processor 120, by considering a priority set for the second electronic device 102-1 and the third electronic device 102-2, play the content on the third electronic device 102-2.

The memory 130 may be further configured to, when executed by the processor 120, store the setting state of the specialized function in the memory 130.

The memory 130 may be further configured to, when executed by the processor 120, play the content on the second electronic device 102-1 after playing the content on the third electronic device 102-2, identify the setting state stored in the memory 130, and set the specialized function of the second electronic device 102-1, based on the setting state.

The memory 130 may be further configured to, when executed by the processor 120, control the specialized function of the second electronic device 102-1.

The memory 130 may be further configured to, when executed by the processor 120, control at least one of a noise-cancelling function and a transparency control function of the second electronic device 102-1.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a communication module, comprising a communication circuitry;
    memory, comprising one or more storage media, storing instructions and a setting state of a specialized function of a second electronic device; and
    at least one processor communicatively coupled to the communication module and the memory;
    wherein the instructions, when executed by the at least one processor individually or collectively, cause the electronic device to:
        play content on the second electronic device connected to the electronic device,
        control the electronic device to identify a third electronic device,
        connect the electronic device to the third electronic device,
        determine whether the specialized function related to playing the content is present among functions of the second electronic device and is active,
        play the content, played on the second electronic device, on the third electronic device, and
        deactivate the specialized function on the second electronic device based on playing the content on the third electronic device.

2. The electronic device of claim 1, wherein the instructions, when executed by the at least one processor individually or collectively, further cause the electronic device to:
    by considering a priority set for the second electronic device and the third electronic device, in case the priority of the third electronic device is higher than the priority of the second electronic device, play the content on the third electronic device.

3. The electronic device of claim 1, wherein the instructions, when executed by the at least one processor individually or collectively, further cause the electronic device to:
    store the setting state of the specialized function in the memory.

4. The electronic device of claim 3, wherein the instructions, when executed by the at least one processor individually or collectively, further cause the electronic device to:
    play the content on the second electronic device after playing the content on the third electronic device,
    identify the setting state stored in the memory, and
    set the specialized function of the second electronic device, based on the setting state.

5. The electronic device of claim 1, wherein the instructions, when executed by the at least one processor individually or collectively, further cause the electronic device to:
control the specialized function of the second electronic device.

6. The electronic device of claim 5, wherein the instructions, when executed by the at least one processor individually or collectively, further cause the electronic device to:
control at least one of a noise-cancelling function or a transparency control function of the second electronic device.

7. A method of controlling a content playing device, the method comprising:
playing content on a second electronic device connected to an electronic device;
identifying, by the electronic device, a third electronic device and connecting the electronic device to the third electronic device;
determining whether a specialized function related to playing the content is present among functions of the second electronic device and is active;
playing the content, played on the second electronic device, on the third electronic device; and
deactivating the specialized function on the second electronic device based on playing the content on the third electronic device.

8. The method of claim 7, wherein the playing of the content on the third electronic device comprises, by considering a priority set for the second electronic device and the third electronic device, in case the priority of the third electronic device is higher than the priority of the second electronic device, playing the content on the third electronic device.

9. The method of claim 7, wherein the determining whether the specialized function is present comprises storing, in memory, a setting state of the specialized function for the second electronic device.

10. The method of claim 9, further comprising:
playing the content on the second electronic device after playing the content on the third electronic device;
identifying the setting state stored in the memory; and
setting the specialized function of the second electronic device, based on the setting state.

11. The method of claim 7, wherein the determining whether the specialized function is present comprises controlling the specialized function of the second electronic device.

12. The method of claim 11, wherein the controlling of the specialized function comprises controlling at least one of a noise-cancelling function or a transparency control function of the second electronic device.

13. A method of controlling a content playing device, the method comprising:
playing content on a second electronic device that is connected to an electronic device and communicates with the electronic device;
identifying, by the electronic device, a third electronic device and connecting the third electronic device to the electronic device to communicate with each other;
among functions, related to playing the content, of the second electronic device, determining a specialized function affecting a user's sense when the second electronic device does not play the content;
determining whether the specialized function related to playing the content is present among functions of the second electronic device and is active;
playing the content, played on the second electronic device, on the third electronic device; and
controlling the second electronic device to deactivate the specialized function based on playing the content on the third electronic device.

14. The method of claim 13, wherein the determining of the specialized function comprises determining the specialized function by comparing a function of the second electronic device with a function that is set to be controlled in response to the content being played on the third electronic device.

15. The method of claim 14, wherein the controlling of the second electronic device comprises deactivating at least one of a noise-cancelling function or a transparency control function of the second electronic device.

16. The method of claim 13, wherein the playing of the content on the third electronic device comprises, by considering a priority set for the second electronic device and the third electronic device, in case the priority of the third electronic device is higher than the priority of the second electronic device, playing the content on the third electronic device.

17. The method of claim 16, wherein the priority of the second electronic device comprises one of a preset priority or a priority determined by a user input.

18. The method of claim 13, wherein the determining of the specialized function comprises:
storing a setting state of the specialized function in a memory;
playing the content on the second electronic device after playing the content on the third electronic device;
identifying the setting state stored in the memory; and
setting the specialized function of the second electronic device, based on the setting state.

19. The method of claim 18, wherein the playing of the content on the second electronic device after playing the content on the third electronic device further comprises:
determining whether the content is playable on the second electronic device.

20. The method of claim 19, wherein the determination of whether the content is playable on the second electronic device is made in response to one of power of the third electronic device being turned off, or the third electronic device disconnecting from the electronic device.

* * * * *